April 29, 1952 DU BOIS EASTMAN ET AL 2,594,301
CATALYTIC REDUCTION OF CARBON MONOXIDE WITH HYDROGEN
Filed June 17, 1947
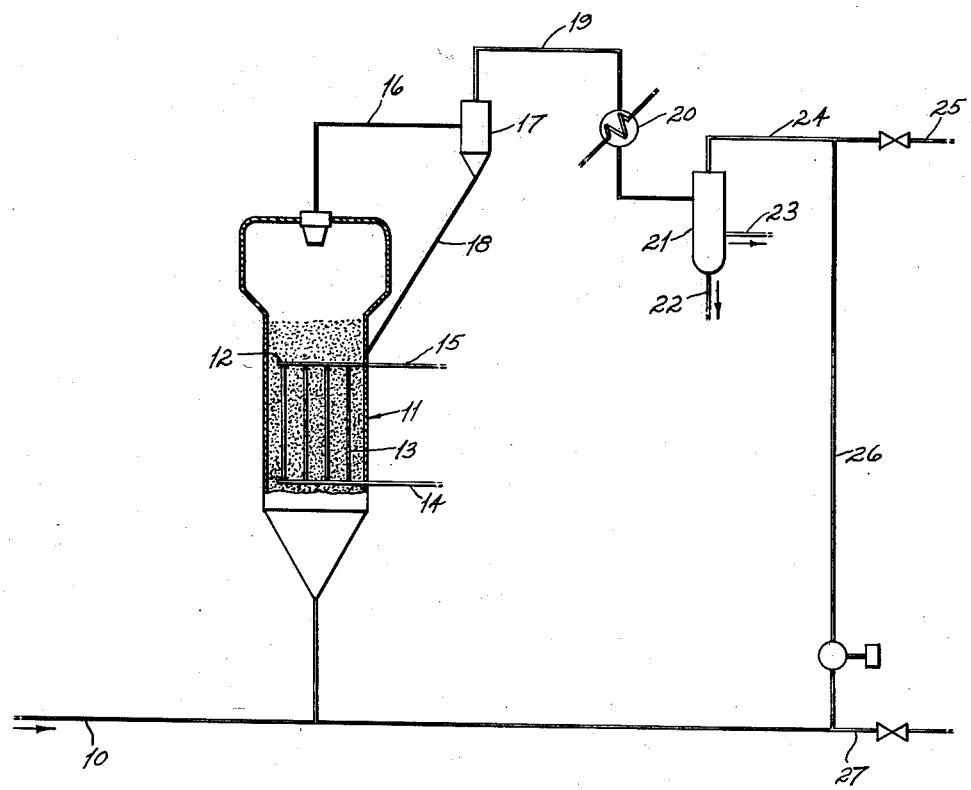
INVENTORS
DU BOIS EASTMAN
LEON P. GAUCHER
BY
ATTORNEYS Patented Apr. 29, 1952

2,594,301

UNITED STATES PATENT OFFICE 2,594,301

CATALYTIC REDUCTION OF CARBON MONOXIDE WITH HYDROGEN

Du Bois Eastman, Scarsdale, and Leon P. Gaucher, Mount Vernon, N. Y., assignors to The Texas Company, New York, N. Y., a corporation of Delaware Application June 17, 1947, Serial No. 755,234

2 Claims. (Cl. 260—449.6)

The present invention relates to the catalytic synthesis of hydrocarbons and oxygenated hydrocarbons, and is more particularly concerned with the production of normally liquid products, advantageously those suitable for use as motor gasoline.

More specifically, the present invention contemplates the catalytic reduction of carbon monoxide by hydrogen in the presence of an active hydrocarbon synthesis catalyst. The reactants, hydrogen and carbon monoxide, together with an addition of water vapor in an amount sufficient to suppress the formation of light paraffinic hydrocarbons, are continuously passed into a reaction zone into contact with the catalyst, under reaction conditions, and after an appropriate contact time the gasiform reaction products are withdrawn, continuously subjected to condensation and separation of liquid products and the normally gaseous residue returned, at an appropriate recycle rate, into admixture with the fresh feed gas.

Advantageously the recycle rate is maintained at a value above that at which minimum gaseous paraffin formation occurs in the substantial absence of added water vapor, such addition being made at a rate at which the net formation of light paraffinic hydrocarbons is not materially increased above such minimum, while the reaction goes substantially further toward completion with relatively low net $CO_2$ production and a corresponding overall increased production of liquid products.

The desired recycle rate is advantageously within or above the range disclosed in our copending application, Serial No. 755,235, filed June 17, 1947, now abandoned, being a function of the molar ratio of hydrogen to carbon monoxide in the fresh feed synthesis gas, expressed in the following relationship:

$$Y = \frac{4.46}{X} - 0.64 \pm 0.3$$

where:

X is the molar ratio of hydrogen to carbon monoxide in the fresh feed reactant synthesis gas; and Y is the recycle ratio expressed as the ratio which the standard volume rate of recycle of the normally gaseous reaction products bears to the standard volume rate of feed of the fresh feed hydrogen and carbon monoxide supplied to contact with the catalyst in the reaction zone.

That is to say, at recycle ratios within the ranges indicated, the inclusion of water vapor suppresses net formation of paraffin gases with an increased yield of liquid product. On the other hand, it is particularly advantageous to increase the recycle ratio appreciably above this range to a value substantially greater than that represented by the relationship $$Y = \frac{4.46}{X} - 0.64$$

since in the presence of the added water vapor, increased conversions and lowered carbon dioxide formation result without objectionable increase in paraffin gas formation.

Thus the invention contemplates operation at a recycle rate above the lower limit of the range above specified, but preferably at recycle rates above the median of this range, and, best, above the upper limit thereof for optimum yield of liquid product. At excessively high recycle ratios this advantage tends to be counteracted by an increasing propensity toward the formation of carbon dioxide and a large proportion of oxygenated hydrocarbons usually unsuitable for use as liquid petroleum fractions. The preferred upper limit of the recycling range occurs at a value of Y equal to $$\frac{4.46}{X} + 0.36$$

and, in the broadest aspect of the invention, $$\frac{4.46}{X} + 1.36$$

The portion of water vapor to be included in the total feed to the reaction zone may be determined by experiment, but for optimum results will approximately equal, in mols, the atoms of paraffinic carbon contained in the recycle stream prior to the addition of water. Olefinic carbon appears to have no appreciable effect on this relationship so far as the objectives of the present invention are concerned. In short, the molar proportion of water vapor supplied to the system should approximate the atomic proportion of carbon in the form of normally gaseous paraffinic hydrocarbons fed to the reaction zone in the absence of added water vapor.

For example, with a fresh feed gas containing about 2 mol parts of hydrogen to one of carbon monoxide, and with no water vapor addition, the recycle ratio is to be above about 1.3, and preferably above about 1.6, at which latter value a typical recycle stream in the case of operations with which we are familiar, will contain about 0.5 atom of carbon in the form of light gaseous paraffinic hydrocarbons per mol of carbon monoxide in the fresh feed. With an increase in recycle ratio, the content of saturated hydrocarbon gases in the recycle increases somewhat. Some variation will likewise accompany a variation in the fresh feed ratio of $H_2:CO$. Therefore, the quickest way for determining the required addition of water vapor is to operate briefly without water vapor addition, and make an analysis of the stream, for determination of paraffinic hydrocarbon content.

The present invention contemplates the continuous addition of water vapor at a molar rate ranging from about 50% to 200% of the atom quantity of carbon, which would be present as gaseous paraffins in the recycle stream, in the absence of the added water vapor.

As clearly intimated above, however, upon addition of the water, the portion of gaseous paraffins in the recycle stream will decrease somewhat so that the actual recycle of these gases no longer meets the foregoing basis of comparison in determining the proper addition of water vapor.

Most advantageously, the increase in proportion of added water vapor within the range given is correlated to an increase in the permissible range of recycle ratios corresponding to the relative proportions of hydrogen and carbon monoxide in the fresh feed gas. That is to say, at recycle ratios within the range covered by the invention, a corresponding increase in water vapor to a value nearer the upper limit usually results in an overall increase in the yield of liquid products per mol of carbon monoxide supplied to the system.

The present invention is of particular advantage in that it results in substantial suppression of paraffinic hydrocarbon gases and, in the preferred embodiment, permits the attainment of substantially greater degrees of overall conversion of the reactants with a commensurate increase in yield of the desired liquid hydrocarbon products at the expense of undesired carbon dioxide formation. As pointed out in our aforesaid copending application, within the optimum range of recycle ratio therein disclosed, the formation of methane and other light gaseous paraffins is reduced to a minimum for simple recycle operation. At higher recycle ratios without water addition, a decreased net formation of carbon dioxide seems to follow progressively an increase in the degree of conversion of the carbon monoxide fed. In short with increased recycling, the net conversion of $H_2$ and CO more closely approaches complete utilization with accompanying advantages of lower $CO_2$. However, above the foregoing critical range of recycle rates, this occurs at the expense of a corresponding increase in the net formation of paraffinic hydrocarbon gases with no benefit in the overall production of liquid hydrocarbons.

Thus, in a typical operation with an active iron catalyst and without water vapor addition, using a fresh feed synthesis gas having a hydrogen to carbon monoxide ratio of about 2:1, and a recycle ratio of about 1.5:1, there is a 94.4% conversion of the carbon monoxide introduced to the system with a low net gaseous paraffin formation of about 4%, and a net carbon dioxide formation of about 9%, all on the basis of the carbon monoxide consumed. At higher recycle ratios however, the degree of carbon monoxide conversion increases progressively with a lower net formation of carbon dioxide but an objectionably increased formation of gaseous paraffins.

In accordance with the present invention, however, the inclusion of water vapor within the ranges specified results in a decreased formation of methane and other light gaseous paraffins which enables the use of higher recycle ratios within the permissible range, in which the reaction goes materially further toward completion with a lower net carbon dioxide and without objectionable increase in gaseous paraffin formation. Thus with a fresh feed synthesis gas having $H_2:CO$ molor ratio of about 2:1, a recycle rate of about 3:1 and a water vapor addition approximately equalling the rate at which the carbon monoxide is supplied, the carbon monoxide will be about 99.8% consumed, in a typical example, with not more than about 2% net formation of methane, ethane, propane, and with net carbon dioxide formation reduced below 5%, all on the basis of carbon monoxide consumed.

The present invention has further unforeseen advantages in reducing the overall exothermic heat of reaction involved in the system, the correlated addition of water vapor thus facilitating temperature control within the reaction zone so that the reaction may be held more easily within the predetermined temperature limits. Moreover, this factor of temperature control, possibly in conjunction with the favorable effect of the water in the proportions indicated, materially limits the catalyst deterioration due to the formation of carbonaceous deposits.

The present invention is operable with fresh feed synthesis gas containing hydrogen and carbon monoxide in varying ratio such as about 1:1 to about 3:1 and particularly within the range from about 1.2:1 to about 2.5:1. It is to be noted, however, that where the mol proportion of hydrogen to carbon monoxide falls appreciably below 2:1 that the measure of the extent of completion of the reaction is better indicated by the hydrogen consumed in the reaction, realizing, of course, that in such instances the carbon monoxide is in effect present in excess. In general, inert hydrocarbons, such as nitrogen and unsaturated hydrocarbon gases, though undesirable in the process, do not materially affect operation of the present invention, and may be present in varying amounts without altering the principles hereinabove set forth.

The present invention may be carried out in a system such as that indicated more or less diagrammatically in the attached flow sheet, wherein a suitable fresh feed synthesis gas comprising hydrogen and carbon monoxide is introduced by way of line 10 into the bottom of a reactor 11 containing a mass of catalyst 12. A suitable cooling surface, preferably streamlined tubular heat exchanger 13, is immersed within the mass of catalyst and supplied in the usual way with an internal cooling fluid by way of inlet 14 and outlet 15.

From the foregoing, it will be apparent that the invention particularly contemplates use of the catalyst in the fluidized form where the particles thereof are aerated to a so-called dense phase condition by the upflowing gaseous reactants. The effluent products of reaction are withdrawn by way of outlet pipe 16 and pass through a cyclone separator 17, from which any entrained solid particles are redirected to the reaction zone by a dip leg or standpipe 18. Obviously the device 17 may take the form of a ceramic filter or any of the conventional electromagnetic or electrostatic separating devices and the effluent product gases substantially free of entrained solid particles go by way of pipe 19 through a condenser 20 to a separator 21. In the separator the condensate water is continuously withdrawn at 22 and the oil layer removed through pipe 23 for further treatment or use. The dry product gas is taken overhead from the separator as at 24 and the desired portion discharged through pipe 25. The remainder, however, required for recycle passes by way of branch pipe 26 to the lower portion of the reaction zone with the fresh feed gas preferably in uniform admixture.

Means is provided for introducing regulated quantities of steam into the line 26 by way of branch inlet pipe 27. In operation therefore the fresh feed inlet gas mixed with a predetermined recycle stream and the water vapor addition enters the lower portion of the reaction zone under the specific conditions hereinbefore taught, and in preferably uniform admixture is passed through the fluidized mass of catalyst for an appropriate typical contact time. Product water and oil is continuously separated by condensation and the normally gaseous overhead is continuously recirculated to the reaction at the desired rate with a predetermined proportion of water vapor.

The present invention while concerned broadly with the usual catalyst for the hydrocarbon synthesis process in question is primarily directed to catalysts of the iron type, that is to say, the usual catalysts of metallic iron, iron carbide, iron oxide, or other iron compound, powdered iron itself, or any of the usual ores, such as limonite are suitable and may include any of the conventional activators or promoters such as oxides of alkali metal, or alkaline earth metals titania, zirconia, Alundum, and many others. The important improved effects herein noted are particularly consistent in the case of active iron catalysts held in a state of good and uniform fluidization as disclosed above with maintenance of substantially uniform temperatures throughout the reaction zone, preferably by the use of adequate well designed cooling surfaces properly disposed in the mass. On the other hand, heat exchange effected in any other convenient manner known in the art, as for example, by vaporizable liquids circulating cooled catalyst or thermophore passed through the reaction zone, will be suitable where temperature control is adequate.

The temperature of reaction specifically forms no part of the present invention, provided the typical conventional operating temperatures are selected with due regard for the catalyst in question. Broadly the range of operating temperatures extends from about 350° F. to about 700° F., the lower range being typical of catalysts such as cobalt, contemplated within the broadest aspect of the invention. In the case of iron catalysts temperatures from usually about 500–700° F. and more frequently from about 550–700° F. are representative, the typical range of a good active powdered iron catalyst being at a point between 600° F. and 650° F. where predominant liquid hydrocarbon fractions are desired.

Operating pressures in the case of iron catalysts are most advantageously in an elevated range, as for example, from 150–250 pounds per square inch gauge. It is significant to note that within reasonable normal limits, the advantages of the present invention are not materially affected by reasonable variations in synthesis gas, catalyst, temperature, pressure, and contact time. That is to say, within the normal conventional operating range of variation for the catalyst in question with due regard to the particular character of the desired product, the foregoing variables do not impair the attainment of improved results herein taught.

In particular, contact time and space velocity may be varied within wide limits, indicating that the synthesis reaction involved is quite rapid and goes forward to a comparable degree of completion in any practical type of reactor, wherein good contact is effected between the catalyst and the reactants for more than an inappreciable time. In other words, it has been found that contact time is not of great consequence in determining the degree of completion of reaction which as clearly shown above, is primarily dependent upon a recycle rate.

The present invention is concerned, however, with the usual active catalysts by which is meant catalysts capable of rapidly promoting the reduction of carbon monoxide by hydrogen without appreciable thermal reactions. It is to be understood that catalysts of poor or inferior activity may vary materially from the principles underlying the present invention, whereas active catalysts under appropriate reaction conditions will produce results in substantial agreement with those mentioned herein.

It is important to note that the condensation and separation of the liquid products of reaction is advantageously carried out under conditions which result in the separation of these products under conditions such that a substantial separation occurs so that no material amount of volatile hydrocarbons above containing more than three carbon atoms, are returned in the recycle stream. To this end the condenser and separator should preferably operate at as low a temperature as convenient, preferably around 70° F. and below 100° F. in any event. Under such conditions any normally liquid product indicated in the gaseous overhead is reduced to a negligible factor.

While the invention accordingly contemplates the condensation of the water vapor concurrently with the condensation of the hydrocarbon products, and thus requires addition of water vapor to the feed gases, nevertheless the invention may be operated according to any of the recognized expedients designed to remove the normally liquid hydrocarbon fractions while retaining the water vapor in the recycle stream. For example, the normally liquid hydrocarbons may be removed by an adsorption process which permits the product water vapor to remain in the gas and be returned to the system in the proper proportion indicated above..

In accordance with one specific example illustrating the operation of the present invention, a synthesis gas composed of about 64% hydrocarbon and 32% carbon monoxide by volume and containing about 1½% methane, about 1% of carbon dioxide is passed upwardly at a space velocity of about 1000 v./v./hr. in contact with a fluidized mass of catalyst comprising an iron powder of finer than 200 mesh, about 20% passing a 325 mesh screen and containing about 1% of alumina ($Al_2O_3$) and about 0.5% of sodium oxide ($Na_2O$). The temperature of the mass of catalyst is maintained more or less uniformly at about 625° F. by appropriate cooling surfaces immersed in the contact mass. The reaction pressure is about 200 pounds per square inch gauge. The effluent gasiform products are withdrawn from the upper pseudo-liquid surface of the catalyst, condensed and separated at about 70° F. and the liquid normally gaseous products are recycled to the incoming fresh feed at the rate of about 1.5:1. In other words, the stream of recycle gas is adjusted to a rate which equals about 1.5 standard cubic feet of the normally gaseous products of reaction per standard cubic foot of fresh feed synthesis gas introduced to the reactor.

At the same time dry stream is thoroughly intermixed into the recycle stream at a pressure of about 200 pounds per square inch gauge, at a rate equal to about 0.5 mol of water per mol of carbon monoxide in the fresh feed stream. The combined feed of fresh recycled gas and dry steam in good admixture is passed upwardly into the lower portion of the contact mass at a rate approximately 1.5 linear feet per second, and under these conditions is sufficient to maintain the catalyst particles in a uniform state of dense phase fluidization at approximately the aforesaid predetermined temperature. Throughout, over a period of 48 hours' operation, products withdrawn show a 99.4% conversion of carbon monoxide introduced to a system of which about 80% are normally liquid hydrocarbons predominantly in the motor gasoline boiling range, and about 8% are oxygenated hydrocarbons in the nature of alcohols. The net formation of gaseous paraffins, predominantly methane, during this period is about 1% based upon the carbon monoxide converted and there is a net formation of carbon dioxide, on the same basis, equal to about 9%. This example illustrates an important suppression of gaseous paraffins, and occurs apparently without any material increase in production of other undesired by-products, such as gaseous olefins or carbon dioxide.

In accordance with another example carried out under the same reaction conditions as above, the rate of recycle is increased to a value of 3:1 on the same basis and the rate of dry steam addition increased 50% above that rate prevailing in the foregoing example. The rate of supply of the fresh feed gas remains the same and condensation and separation are similarly carried out at 70° F.

Under these conditions and over a comparable period of operation, the total products withdrawn show a conversion of carbon monoxide equal to about 99.8% of that supplied to the system, of which about 82.2% is a normally liquid oily product predominantly hydrocarbons boiling within the motor gasoline range, and including a small proportion of oxygenated hydrocarbons. The net formation of light paraffinic gases containing up to three carbon atoms amounts to about 2% of the carbon monoxide converted, and the net formation of carbon dioxide on the same basis is equal to approximately 5%. Accordingly, it is apparent that an increased yield of desired liquid products can be achieved at the expense of a smaller yield of undesired gaseous by-products accompanying a more complete degree of conversion of the available reactants, where controlled and correlated proportions of water vapor are included at increased recycle ratios.

Where the water vapor addition in the last example is lowered to the same value as that prevailing in the first example, the results are comparable with a small increase in yield of light gaseous paraffins to about 5-6% with a generally corresponding loss in yield of oily liquid products.

It is to be understood that the present invention is not limited to the production of motor gasoline hydrocarbons, but contemplates production of the full range of hydrocarbons and equivalent oxygenated products exceeding only those of light gaseous nature. Thus higher boiling products including diesel oils, gas oil fractions, and even waxes, may be prepared by this invention simply by resort to characteristic and conventional temperatures and pressures, usually temperatures in somewhat lower ranges. As is known, the higher pressures and somewhat higher temperatures favor production of oxygenated hydrocarbons, but these details do not, per se, form any part of the present invention.

The present invention accordingly provides a convenient means for substantially completely eliminating undesired by-products and directing the product distribution toward the predominant production of predetermined hydrocarbon fractions in good yield.

Obviously many modifications and variations of the invention as hereinbefore set forth may be made without departing from the spirit and scope thereof and therefore only such limitations should be imposed as are indicated in the appended claims.

We claim:

1. In the process for the synthesis of normally liquid hydrocarbons, oxygenated hydrocarbons and the like by the catalytic reduction of carbon monoxide with hydrogen wherein a synthesis gas comprising hydrogen and carbon monoxide in a relative molar ratio in the range of from 1:1 to about 3:1 is passed in contact with a dense fluid phase mass of solid particle, iron, hydrocarbon synthesis catalyst in a reaction zone at an elevated temperature in the range of about 500–700° F., and normally liquid products of reaction are recovered from the effluent reaction stream, the improvement which comprises restricting the undesired formation of light gaseous hydrocarbons and carbon dioxide by withdrawing the entire reaction effluent from contact with the catalyst, separating the desired, normally liquid products of reaction therefrom, recycling to the inlet of the reaction zone the residual mixture of normally gaseous products of reaction at a predetermined recycle rate within the range expressed by the value of Y, where Y is above about $$Y = \frac{4.46}{X} - 0.64$$

but not above about $$Y = \frac{4.46}{X} + 0.36$$

where X is the molar ratio of hydrogen to carbon monoxide in the fresh feed reactant synthesis gas, and Y is the recycle ratio expressed as the ratio which the standard volume rate of recycle of the normally gaseous reaction products bears to the standard volume rate of feed of the fresh feed synthesis gas supplied in contact with the catalyst, and continuously including in the feed to the reaction zone water vapor in a molar amount approximating the atomic quantity of carbon which is present as gaseous paraffins in the recycle stream in the absence of the included water vapor.

2. The method according to claim 1, wherein the molar ratio of hydrogen to carbon monoxide in the fresh feed synthesis gas is in the range from about 1.2:1 to about 2.5:1.

DU BOIS EASTMAN.
LEON P. GAUCHER.

REFERENCES CITED

The following references are of record in the file of this patent:

UNITED STATES PATENTS

| Number | Name | Date |
|---|---|---|
| 2,361,997 | Dreyfus | Nov. 7, 1944 |
| 2,455,419 | Johnson | Dec. 8, 1948 |
| 2,475,214 | Barr | July 5, 1949 |
| 2,497,964 | Sumerford | Feb. 21, 1950 |

OTHER REFERENCES

Report No. 248–45, U. S. Naval Technical Mission in Europe (pages 26, 27). Received October 29, 1945.